United States Patent
Vasudevan et al.

(10) Patent No.: US 9,635,672 B2
(45) Date of Patent: Apr. 25, 2017

(54) SCHEDULING AND CONTROLLING DEVICE-TO-DEVICE COMMUNICATION

(71) Applicant: ALCATEL LUCENT, Paris (FR)

(72) Inventors: Subramanian Vasudevan, Morristown, NJ (US); Jialin Zou, Murray Hill, NJ (US); Satish Kanugovi, Bangalore (IN); Ganapathy Sundaram, Hillsborough, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 105 days.

(21) Appl. No.: 14/405,257

(22) PCT Filed: May 22, 2013

(86) PCT No.: PCT/EP2013/060506
§ 371 (c)(1),
(2) Date: Dec. 3, 2014

(87) PCT Pub. No.: WO2013/182422
PCT Pub. Date: Dec. 12, 2013

(65) Prior Publication Data
US 2015/0163789 A1 Jun. 11, 2015

(30) Foreign Application Priority Data
Jun. 5, 2012 (IN) ............................ 1718/DEL/2012

(51) Int. Cl.
*H04W 72/04* (2009.01)
*H04M 15/00* (2006.01)
(Continued)

(52) U.S. Cl.
CPC ......... *H04W 72/048* (2013.01); *H04M 15/61* (2013.01); *H04W 72/0413* (2013.01);
(Continued)

(58) Field of Classification Search
None
See application file for complete search history.

(56) References Cited

U.S. PATENT DOCUMENTS

| | | | | |
|---|---|---|---|---|
| 2010/0165882 A1* | 7/2010 | Palanki | ................. | H04W 8/005 370/254 |
| 2013/0157670 A1* | 6/2013 | Koskela | .............. | H04W 74/006 455/450 |
| 2013/0170414 A1* | 7/2013 | Kwon | ................. | H04W 72/042 370/311 |

FOREIGN PATENT DOCUMENTS

| | | |
|---|---|---|
| JP | 2010-533458 A | 10/2010 |
| WO | WO 2005/053347 A1 | 6/2005 |

(Continued)

OTHER PUBLICATIONS

Gabor Fodor et al., "Design aspects of network assisted device-to-device communications," IEEE Communications Magazine, IEEE Service Center, vol. 50, No. 3, pp. 170-177, XP011429640, Mar. 2012.

(Continued)

*Primary Examiner* — Anh Ngoc Nguyen
(74) *Attorney, Agent, or Firm* — Fay Sharpe, LLP

(57) ABSTRACT

According to an implementation of the present subject matter, systems and methods for scheduling and controlling device-to-device (D2D) communication are described. The method includes receiving device parameters and uplink parameters from a first communication device and at least one second communication device, respectively. Further, based on the device parameters and the uplink parameters, transmission format of a D2D communication link for allowing D2D communication between the first communication device and the at least one second communication device is determined. Further, an uplink transmit grant and an uplink listen grant are transmitted to the first communi- (Continued)

cation device and the at least one second communication device, respectively, based on the determination, wherein the uplink transmit grant and the uplink listen grant indicate at least the transmission format and time of transmission on the D2D communication link to the first communication device and the at least one second communication device.

21 Claims, 4 Drawing Sheets

(51) Int. Cl.
  *H04W 72/12* (2009.01)
  *H04W 76/02* (2009.01)
(52) U.S. Cl.
  CPC ....... *H04W 72/0446* (2013.01); *H04W 72/12* (2013.01); *H04W 76/023* (2013.01)

(56) References Cited

FOREIGN PATENT DOCUMENTS

| WO | 2009/009565 A1 | 1/2009 |
| WO | 2010/078271 A2 | 7/2010 |
| WO | WO 2011/109941 A1 | 9/2011 |

OTHER PUBLICATIONS

International Search Report for PCT/EP2013/060506 dated Nov. 4, 2013.
English Bibliography for JP Patent Application Publication No. 2010533458A, published Oct. 21, 2010, printed from Thomson Innovation on Jan. 22, 2016, 6 pp.
S1-121087, FS_ProSe: ProSe Control Paths, Alcatel-Lucent, 3GPP TSG-SA WG1 #58, Seville, Spain, May 7-11, 2012, 3 pp.
PCT Pat. App. No. PCT/EP2013/060506; Written Opinion of the International Searching Authority; mailed Nov. 4, 2013; 8 pp.

\* cited by examiner

SCHEDULING AND CONTROLLING DEVICE-TO-DEVICE COMMUNICATION

FIELD OF INVENTION

The present subject matter relates to communication and, more particularly but not exclusively, to device-to-device communication.

BACKGROUND

Communication devices, such as cellular phones, smart phones, personal digital assistants (PDAs), portable computers, and desktop computers, provide users with a variety of mobile communication services and computer networking capabilities. These communication services allow data to be exchanged between the network operators and the users. Usually the communication devices transmit data using various wireless communication networks, such as Global System for Mobile Communication (GSM) network, Universal Mobile Telecommunications System (UMTS) network, Wideband Code Division Multiple Access (W-CDMA) network, and Long Term Evolution (LTE).

In recent time there has been a rapid increase in the use of communication devices, resulting in increase in the volume of access requests made for accessing the wireless communication networks. Data transfer over the wireless communication networks may thus not be a speedy and efficient process. Network operators have thus been involved in development of alternate communication techniques, such as device-to-device (D2D) communication. D2D communication concerns wireless communications directly between two communication devices. For example, WiFi Direct is a technique by which devices can directly communicate over WiFi channels without any intermediary nodes.

Using D2D communication instead of the conventional wireless network has resulted in various benefits. For instance, reduction in transmitter power consumption; improvement in spectrum efficiency and network resource utilization; increased cellular network capacity and coverage; and support for additional services, such as heavy data packet transfer.

SUMMARY

This summary is provided to introduce concepts related to scheduling and controlling device-to-device (D2D) communication. This summary is not intended to identify essential features of the claimed subject matter nor is it intended for use in determining or limiting the scope of the claimed subject matter.

In one implementation, a method for scheduling and controlling device-to-device (D2D) communication is described. The method may include receiving device parameters and uplink parameters from a first communication device and at least one second communication device, respectively. The method may further include determining, based on the device parameters and the uplink parameters, transmission format of a D2D communication link between the first communication device and the at least one second communication device. The D2D communication link, in one implementation, allows D2D communication between the first communication device and the at least one second communication device. Further, the method may include transmitting an uplink transmit grant and an uplink listen grant to the first communication device and the at least one second communication device, respectively based on the determination, where the wherein the uplink transmit grant and the uplink listen grant indicate the transmission format and time of transmission on the D2D communication link to the first communication device and the at least one second communication device. Further, the method may include ascertaining the first communication device and the at least one second communication device, from amongst a plurality of communication devices, based at least on one or more priority rules and disabling acknowledgement transmission feature of the at least one second communication device receiving the uplink listen grant.

According to another implementation, an enhanced node B for scheduling and controlling device-to-device (D2D) communication is described herein. In said implementation, the enhanced node B includes a node processor and a node memory coupled to the node processor. The node memory includes a scheduling module configured to receive device parameters and uplink parameters from a first communication device and at least one second communication device, respectively. Further, based on the device parameters and the uplink parameters, the scheduling module determines transmission format of a D2D communication link between the first communication device and the at least one second communication device. In one embodiment, the D2D communication link allows D2D communication between the first communication device and the at least one second communication device. The memory further includes a control module configured to transmit an uplink transmit grant to the first communication device and an uplink listen grant to the at least one second communication device based on the determination, wherein the uplink transmit grant and the uplink listen grant indicate the transmission format and time of transmission on the D2D communication link to the first communication device and the at least one second communication device.

According to yet another implementation, a computer-readable medium having embodied thereon a computer program for executing a method for scheduling and controlling device-to-device (D2D) communication is described herein. In said implementation, the method includes receiving device parameters and uplink parameters from a first communication device and at least one second communication device, respectively. The method may further include determining, based on the device parameters and the uplink parameters, transmission format of a D2D communication link between the first communication device and the at least one second communication device. Further, the method may include transmitting an uplink transmit grant and an uplink listen grant to the first communication device and the at least one second communication device, respectively based on the determination, where the wherein the uplink transmit grant and the uplink listen grant indicate the transmission format and time of transmission on the D2D communication link to the first communication device and the at least one second communication device.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
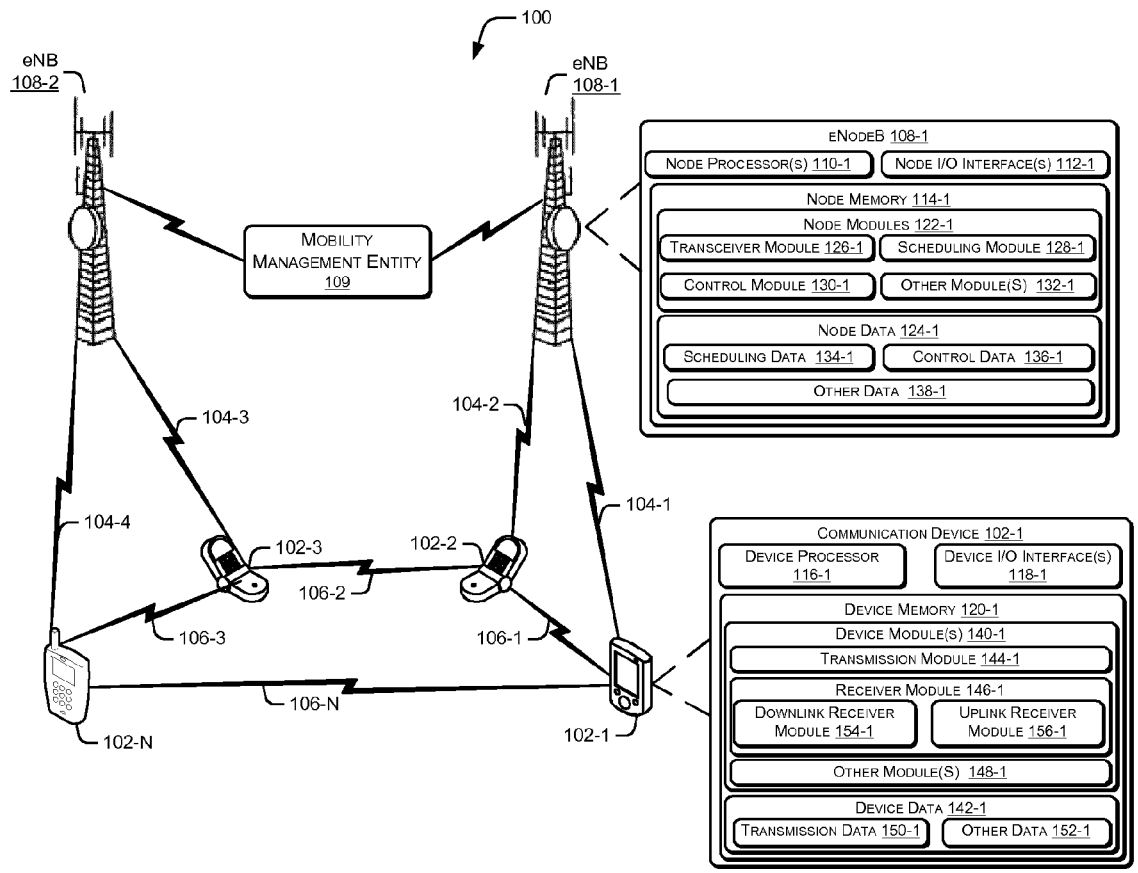
FIG. 1 illustrates an exemplary communication network environment, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

DESCRIPTION OF EMBODIMENTS

Systems and methods for scheduling and controlling device-to-device (D2D) communication in a wireless communication network are described. The methods can be implemented in various communication devices communicating through various communication networks. The communication devices that can implement the described method(s) include, but are not limited to, cellular phones, smart phones, personal digital assistants (PDAs), portable computers, desktop computers, servers and the like. The communication networks in which the described method(s) can be implemented include, but are not limited to, Long Term Evolution (LTE), and the like. Although the description herein is with reference to LTE, the methods and systems may be implemented in other communicating networks that involve scheduled uplink transmissions, albeit with a few variations, as will be understood by a person skilled in the art.

D2D communication, as will be understood, concerns wireless communications directly between two or more communication devices. For instance, two communication devices in proximity to each other may, instead of communicating with each other using a base station, such as an enhanced node B (eNodeB), communicate directly with each other. Transmitting data directly between two communication devices facilitates reduction in transmitter power consumption and improvement in spectrum efficiency. Enhanced network connectivity using the D2D communication link allow the users to utilize data intensive multimedia services like Push-to-X video calling, live media streaming, audio and video downloading/streaming, voice communications, video communications, online gaming, and real time social networking. Additionally, since the communication devices communicate with each other without using the network resources, the network resources may be allocated to other communication devices, thus improving network resource utilization.

In order to avoid interference with the communication devices communicating over the conventional wireless networks, the D2D communications typically use either a separate spectrum or the same spectrum as used by the conventional wireless networks under supervision and control of the conventional wireless networks. Using a dedicated spectrum may however not be efficient in terms of spectrum usage as the dedicated spectrum network resources cannot be dynamically shared and balanced with the regular network routed users according to the usage. Further, using the dedicated spectrum may require the communication devices to operate in different frequency bands and path for transferring data and control signals thus utilizing additional network resources.

In another conventional approach alternate to using the dedicated licensed spectrum, the same spectrum as used by the conventional wireless networks, hereinafter referred to as the network routed communication, may be used. This approach requires the communication devices to be dynamically allocated physical resource blocks for the D2D communication from the spectrum shared with the other regular network routed users. The dynamic allocation of the spectrum may however result in interference between the communication devices already using the spectrum for network routed communication and the communication devices that want to use the spectrum for the D2D communication. Additionally, the network operators do not have sufficient provisions for monitoring such utilization of the resources and thus billing and accounting related activities are not managed properly.

According to an implementation of the present subject matter, systems and methods for scheduling and controlling D2D communication are described. In one embodiment, two or more communication devices communicating with each other over a wireless communication, such as the LTE network may initiate a D2D communication in order to exchange data without using the network routed communication. The present method for scheduling and controlling D2D communication involves allocation of network resources by the eNodeB (eNB). This enables the network operators to charge users of the communication devices for using the D2D communication as the eNB may track resources which have been utilized during the D2D communication. Further, enabling the eNB to schedule and control the D2D communication facilitates reduction in interference between communication devices as the communication devices can be allocated separate physical resource blocks based on the individual requirements and the current network utilization.

According to one embodiment of the subject matter, a first communication device like a user equipment, say a user equipment (UE)1 may initially determine whether at least one second communication device UE2 is willing to initiate the D2D communication with the UE1. Based on a confirmation of willingness of the UE2, the UE1 may send a D2D service request to an eNB, with which the UE1 is registered. The eNB may then verify whether the UE1 and UE2 can initiate the D2D communication. In one embodiment, the eNB may communicate with a mobility management entity (MME) to verify if the UE1 and UE2 are allowed to initiate the D2D communication. For instance, the MME may check whether network operators of the UE1 and UE2 permit a D2D communication or not. On receiving a confirmation allowing D2D communication, the UE1 and UE2 may send a first scheduling request and a second scheduling request to the eNB, respectively for allocating resources required for the D2D communication. The first scheduling request and the second scheduling request, in one implementation, may include a request for allocation of an uplink channel for communication with the eNB and a D2D indication for the eNB, indicating the intent of the UE1 and the UE2, respectively for establishing the D2D communication link. In another implementation, the second scheduling request may include only the request for allocation of an uplink channel for communication with the eNB.

Based on the first scheduling request and the second scheduling request, the eNB may send an uplink grant to UE1 and UE2 for sending one or more device parameters and uplink parameters, respectively to the eNB. The device parameters may be understood as the parameters describing features of the communication devices required by the eNB to determine transmission format of a D2D communication link for the D2D communication. In one implementation, the transmission format may include, but is not restricted to, a physical resource block, modulation and coding format, and power level. The physical resource block may be defined as logical channels for transmission that may be allocated to the communication devices. The modulation and coding format may be defined as modulation and techniques, such as Quadrature Phase Shift Keying (QPSK), 64 Quadrature Amplitude Modulation (QAM), and 16 QAM, that may be used for coding and modulating data packets to be transferred by the UE1. The power level may be defined as the power at which the UE1 needs to transmit the data packets. In one embodiment, the device parameters may include, for example, the power headroom (PHR) and buffer status report (BSR), i.e., details of data to be transmitted by the UE1. While, the uplink parameters may include sounding reference signal report (SRSR), i.e., indication of quality of transmission by the UE1 over one or more uplink channels designated for the D2D communication. Further, the device parameters and the uplink parameters may be used to determine whether it is viable to establish a D2D communication link between the communication devices.

Based on the determination of the transmission format, the eNB may inform the transmission format to the communication devices for establishing the D2D communication. In one implementation, the communication devices may establish the D2D communication over an uplink channel only, thus facilitating optimum utilization of the available spectrum for communication.

On establishment of the D2D communication link, the communication devices may start transferring the data over the D2D communication link. For instance, in the above example of communication between the UE1 and the UE2, UE1 may start transmitting the data to the UE2 over the D2D communication link. The UE2 may subsequently send an acknowledgement signal confirming success or failure of the data transmission. For instance, on a successful transmission, i.e., on receiving the data, UE2 may send an acknowledgement signal to the UE1 and the eNB confirming the safe receipt of the data. While on an unsuccessful transmission, i.e., on not receiving data successfully, UE2 may send a negative acknowledgement signal informing the UE1 and the eNB about having received no, corrupted, or partial data from the UE1.

Although the present subject matter has been described in the context of two communication devices registered with the same eNB, it will be understood that the method and systems for scheduling and controlling D2D communication may also be implemented between two communication devices registered with two different eNB, albeit with few alteration and/or modifications that will be apparent to one skilled in the art.

Further, although, the present subject matter has been described for a two party communication, i.e., a mode of D2D communication wherein only two communication device with each other, it will be understood that the systems and methods for scheduling and controlling D2D communication can also be implemented for a multi-party communication where a first communication device may transmit data to a plurality of communication devices in its vicinity, albeit with few modification/alterations. Accordingly, as apparent in the multi-party communication mode of D2D communication, the communication occurs between a transmitting device, referred to a first communication device, and more than one receiving devices, referred to as second communication devices.

The present subject matter thus enables the eNB to schedule and control a dynamic D2D communication between two communication devices. Enabling the eNB to schedule and control the D2D communication helps in optimizing the spectrum and resource utilization for the D2D communication. Further, the present subject matter facilitates in determining whether transmitting the data over the D2D communication link would be efficient over the network routed communication or not. Further, enabling the eNB to schedule and control the D2D communication enables reduction in interference between communication devices as the communication devices are allocated separate transmission format based on the individual requirements and the current network utilization. Additionally, in case of congestion in the routed network, the eNB may offload few communication devices, for example, communications devices in vicinity, to the D2D communication, thus reducing interference and congestion in the routed network. Further, the present subject matter enables network operators to charge users of the communication devices for using the D2D communication as the eNB may track resources which the communication devices have utilized while being engaged in the D2D communication.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Figure 2A:
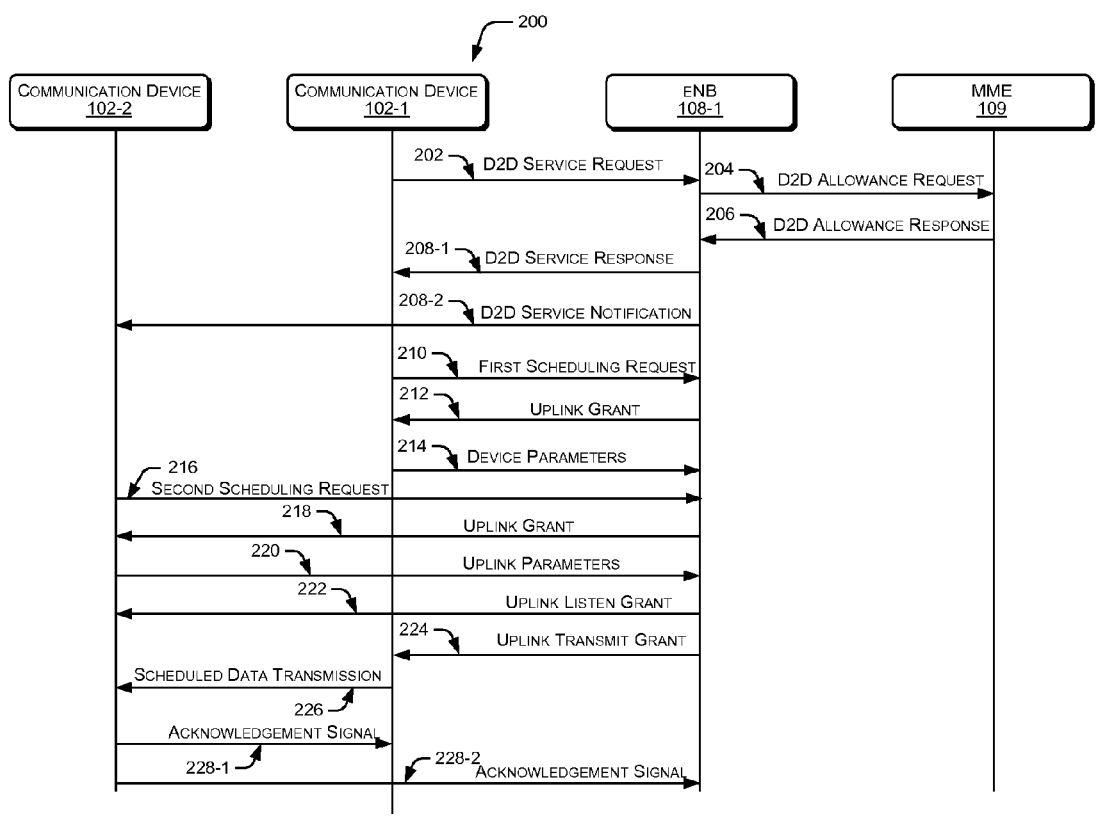
FIGS. 2(a) and 2(b) represent call flow diagrams indicating procedures of controlling and scheduling device-to-device (D2D) communication in a communication network, in accordance with an embodiment of the present subject matter.
Figure 2B:
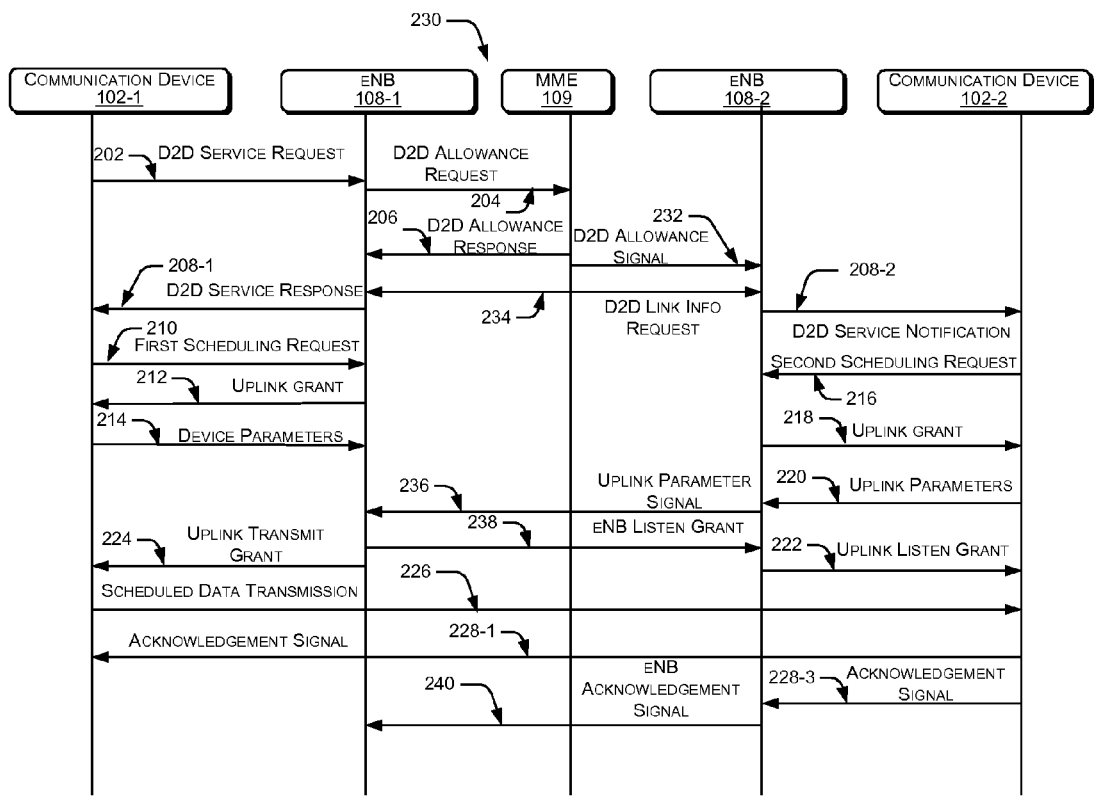
Figure 3:
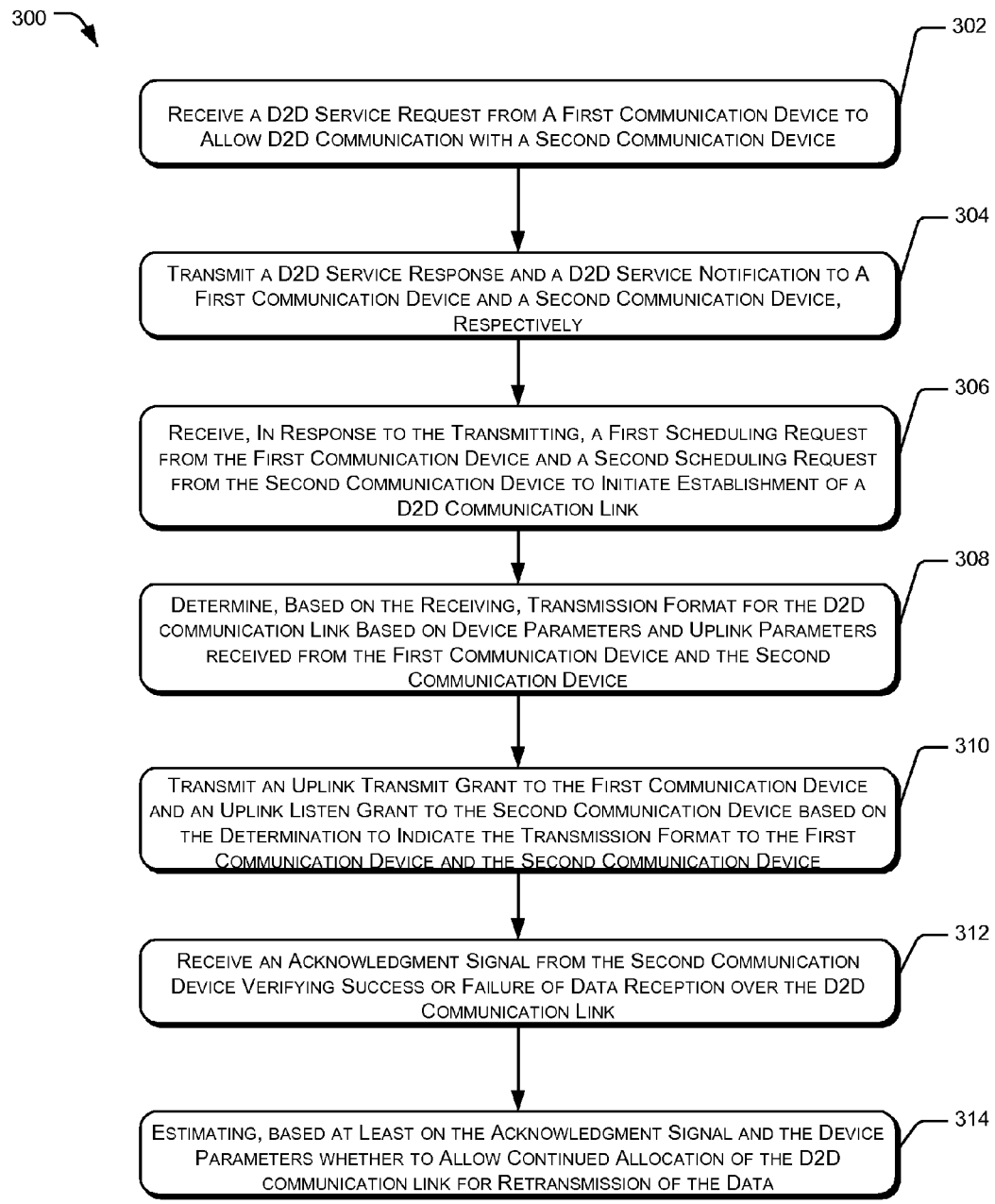
FIG. 3 illustrates a method for scheduling and controlling D2D communication in a communication network, in accordance with an embodiment of the present subject matter.

The manner in which the systems and methods for optimizing D2D communication between two communication devices is implemented shall be explained in details with respect to the FIGS. 1-3. While aspects of described systems and methods for optimizing D2D communication between two communication devices can be implemented in any number of different computing systems, transmission environments, and/or configurations, the embodiments are described in the context of the following exemplary system(s).

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" and "coupled" is used throughout for clarity of the description and can include either a direct connection or an indirect connection.

FIG. 1 illustrates a communication network environment 100 for controlling and scheduling D2D communication between two or more communication devices, according to an embodiment of the present subject matter. The communication network environment 100 includes one or more communication devices 102-1, 102-2, . . . , and 102-N, collectively referred to as communication devices 102 and individually referred to as communication device 102 hereinafter, communicating with each other through a communication network.

The communication network may be a wireless network, or a combination of wired and wireless network. The communication network can be a collection of individual networks, interconnected with each other and functioning as a single large network (e.g., the internet or an intranet). Examples of such individual networks include, but are not limited to, 3rd Generation Partnership Project (3GPP) Long Term Evolution (LTE), and the like. Although the description herein is with reference to LTE, the methods and systems may be implemented in other communicating networks involving scheduled uplink transmissions, albeit with a few variations, as will be understood by a person skilled in the art. Further, depending on the technology, the communication network includes various network entities, such as gateways, routers; however, such details have been omitted for ease of understanding.

The communication devices 102 may be defined as User Equipments (UEs) used by users to communicate with each other. Examples of the communication devices 102 may include, without limitation, mobile phones, landline phones, desktop computers, hand-held devices, laptops or other portable computers, network computers, and the like. Each of the communication devices 102 works on a communication protocol as defined by the communication network to which the communication device 102 is coupled. Further, the communication devices 102 are configured to interact with each over the communication network either using network routed communication links 104-1, 104-2, 104-3, . . . , 104-n, hereinafter collectively referred to as the network routed communication links 104, or D2D communication links 106-1, 106-2, 106-3, . . . , 106-n, hereinafter collectively referred to as the D2D communication links 106.

The network routed communication links 104 may be understood as communication links used in conventional communication where the communication devices 102 interact with each other through network resources, such as one or more eNodeBs 108-1 and 108-2 (hereinafter collectively referred to as eNBs 108 and individually referred to as eNB 108), mobility management entity (MME) 109, and a packet data network (PDN) gateway (not shown in the figure). While the D2D communication links 106 may be understood as communication links used for D2D communication, i.e., direct communication between two or more communication devices without using the network resources, such as the eNBs 108, the MME 109, and the PDN gateway.

In one embodiment, two communication devices 102, in order to interact using the D2D communication, may communicate with the eNBs 108, with which the communication devices 102 are registered. For instance, a first communication device, say the communication device 102-1 may communicate with the eNB 108-1 for requesting resource allocation for establishing the D2D communication link 106-1 with a second communication device, say the communication device 102-2. The eNB 108 is configured to schedule and control D2D communication between the communication devices 102 that are registered with the eNB 108. For example, the eNB 108-1 may be configured to schedule and control D2D communication between the communication devices 102-1 and 102-2 registered with the eNB 108-1, while the eNB 108-2 may be configured to schedule and control D2D communication between the communication devices 102-3 and 102-n that are registered with the eNB 108-2.

Further, in one embodiment, the D2D communication between two communication devices registered with two different eNBs may be scheduled by both the eNBs together. For example, the eNB 108-1 and the eNB 108-2 may be configured to schedule and control D2D communication between the communication devices 102-1 and 102-3. For the sake of brevity and not as a limitation, the present subject matter has been explained with reference to two communication devices 102 registered with the same eNB 108 while concepts relating to scheduling and control of D2D communication between two communication devices 102 registered with the different eNB 108 have been explained later in the specification with respect to the call flow diagram of FIG. 2b.

In one implementation, each of the eNBs 108 includes node processor(s), node I/O interface(s), and a node memory coupled to the node processors. For instance, the eNB 108-1 includes one or more node processor(s) 110-1, node I/O interface(s) 112-1, and a node memory 114-1 coupled to the node processor 110-1. Although, the node processor(s) 110-1, the node I/O interface(s) 112-1, and the node memory 114-1 have been shown for only the eNB 108-1, it will be understood that the same will be implemented in all the eNBs 108. The node processors for all the eNBs 108 are hereinafter collectively referred to as the node processor(s) 110. The node I/O interface(s) for all the eNBs 108 are hereinafter collectively referred to as the node I/O interface(s) 112 and similarly, the node memory for all the eNBs 108 are hereinafter collectively referred to as the node memory 114.

Further, each of the communication devices 102 includes device processor(s), device I/O interface(s), and a device memory coupled to the device processors. For example, the communication device 102-1 includes device processor(s) 116-1, device I/O interface(s) 118-1, and a device memory 120-1 coupled to the device processor 116-1. Although, the device processor(s), the device I/O interface(s), and the device memory have been shown for only the communication device 102-1, it will be understood that the same will be implemented in all the communication devices 102. The device processors for all the communication devices 102 are hereinafter collectively referred to as the device processor(s) 116. The device I/O interface(s) for all the communication devices 102 are hereinafter collectively referred to as the device I/O interface(s) 118 and similarly, the device memory for all the communication devices 102 are hereinafter collectively referred to as the device memory 120.

Each of the node processors 110 and the device processor 116 can be a single processing unit or a number of units, all of which could also include multiple computing units. The node processors 110 and the device processor 116 may be implemented as one or more microprocessors, microcomputers, microcontrollers, digital signal processors, central processing units, state machines, logic circuitries, and/or any devices that manipulate signals based on operational instructions. Among other capabilities, each of the node processors 110 and the device processor 116 is configured to fetch and execute computer-readable instructions and data stored in the node memory 114 and the device memory 120, respectively.

Functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Each of the node I/O interfaces 112 and the device I/O interfaces 118 may include a variety of software and hardware interfaces, for example, interface for peripheral device(s), such as a keyboard, a mouse, an external memory, and a printer. Further, the node I/O interfaces 112 may enable the eNB 108 to communicate with other network entities, such as the MME, the PDN gateway, and like. Likewise the device I/O interfaces 118 may enable the communication devices 102 to communicate with other network entities, such as the eNB 108, and like.

Each of the node memory 114 and the device memory 120 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. Each of the node memory 114 and the device memory 120 also includes module(s) and data.

In one implementation, each of the node memory 114 includes node modules 122 and node data 124. The node module(s) 122 include routines, programs, objects, components, data structures, etc., which perform particular tasks or implement particular abstract data types. Each of the node module(s) 122 further includes a node transceiver module, a scheduling module, a control module, and other module(s). For example, the eNB 108-1 includes a transceiver module 126-1, a scheduling module 128-1, a control module 130-1, and other module(s) 132-1. The other module(s) 132-1 may include programs or coded instructions that supplement applications and functions of the eNB 108-1.

On the other hand, the node data 124, amongst other things, serves as a repository for storing data processed, received, and generated by one or more of the node module(s). Each of the node data 124 further includes scheduling data, control data, and other data. For example, the node data 124-1 of the eNB 108-1 includes scheduling data 134-1, control data 136-1, and other data 138-1. The other data 138-1 includes data generated as a result of the execution of one or more modules in the other module(s) 132-1. Although, the transceiver module 126-1, the scheduling module 128-1, the control module 130-1, the other modules 132-1, the scheduling data 134-1, the control data 136-1, and the other data 138-1 have been shown for only the eNB 108-1, it will be understood that the same will be implemented in all the eNBs 108 since each of the eNB 108 is structurally and functionally similar. Accordingly, the transceiver module for all the eNBs 108 are hereinafter collectively referred to as the transceiver module 126. The scheduling module for all the eNBs 108 are hereinafter collectively referred to as the scheduling module 128. The control module for all the eNBs 108 are hereinafter collectively referred to as the control module 130 and similarly, the other modules for all the eNBs 108 are hereinafter collectively referred to as the other modules 132. Further, the scheduling data for all the eNBs 108 are hereinafter collectively referred to as the scheduling data 134. The control data for all the eNBs 108 are hereinafter collectively referred to as the control data 136 and similarly, the other data for all the eNBs 108 are hereinafter collectively referred to as the other data 138.

Further, each of the device memory 120 includes device modules 140 and device data 142. The device module(s) 140 include routines, programs, objects, components, data structures, etc., which perform particular tasks or implement particular abstract data types. Each of the device module(s) 140 further includes a transmission module 144, a receiver module 146, and other module(s) 148. For example, the communication device 102-1 includes a transmission module 144-1, a receiver module 146-1, and other module(s) 148-1. As mentioned previously in context of eNB 108, each of the communication devices 102 are also functionally alike and thus although, the transmission module, the receiver module, and the other module(s) have been depicted in FIG. 1 for only the communication device 102-1, it will be understood that the same will be implemented in each of the communication devices 102.

On the other hand, the device data 142, amongst other things, serves as a repository for storing data processed, received, and generated by one or more of the node module(s). Each of the device data 142 further includes transmission data 150 and other data 152. For example, the device data 142 of the eNB 108-1 includes transmission data 150-1 and other data 152-1. The other data 152-1 includes data generated as a result of the execution of one or more modules in the other module(s) 148-1.

In one implementation, the communication device 102-1 may initially communicate with the communication device 102-2, say over the network routed communication link 104-1, to verify if the communication device 102-2 would like to communicate over the D2D communication link 106. For example, an application, say, a chat application running on the communication device 102-1 may detect that a similar chat application is also running on the communication device 102-2 through an application server to which both the communication devices 102-1 and 102-2 are registered. The communication device 102-1 may then verify with the communication device 102-2 if the communication device 102-2 would like to communicate over the D2D communication link 106. On receiving verification from the communication device 102-2, the transmission module 140-1 of the communication device 102-1 may send a D2D service request to the eNB 108-1. In one implementation, the D2D service request may include identifier details, such as email ID, phone number, and IP address of the communication device 102-1 and the communication device 102-2.

The eNB 108 may subsequently communicate with the MME 109 to verify whether the communication devices 102-1 and 102-2 can initiate the D2D communication. In one embodiment, the transceiver module 126-1 of the eNB 108-1 may send the identifier details of the communication device 102-1 and 102-2 to the MME 109 for the verification. The MME 109 may verify, based on the identifier details whether the communication devices 102-1 and 102-2 are allowed to initiate the D2D communication. For example, the MME 109 may verify if the communication devices 102-1 and 102-2 have subscribed for the D2D service or not. In another example, the MME 109 may verify if network operators of the communication devices 102-1 and 102-2 permit a D2D communication or not.

On receiving a confirmation allowing D2D communication from the MME 109, the transceiver module 126 may send sounding reference signal (SRS) parameters of the communication devices 102-1 to the communication device 102-2 and the SRSP parameters (SRSP) of the communication device 102-2 to the communication device 102-1. The SRSP may be defined, in one example, as uplink physical resource blocks over which the communication devices 102-1 and 102-2 send the sounding reference signal for the receiver module 146 to evaluate uplink channel quality of the communication device transmitting the data packets, i.e., the communication device 102-1 in the present example. On receiving the SRSP from the eNB 108-1, the transmission modules 144 of the communication device 102-1 and 102-2 may send a first scheduling request and a second scheduling request to the eNB 108-1, respectively. Further, the communication devices 102-1 and 102-2 may also start measuring the uplink channel quality of each other using the SRSP information provided by the eNB 108-1. In one implementation, first scheduling request and the second scheduling request may include a request for allocation of an uplink channel for communication with the eNB 108-1 and a D2D indication for the eNB 108-1, indicating the intent of the communication device 102-1 and the communication device 102-2, respectively for establishing the D2D communication link 106. In another implementation, the second scheduling request may include only the request for allocation of an uplink channel for communication with the eNB 108-1.

The transceiver module 126-1 receives the first scheduling request and the second scheduling request from the transmission module 144 and saves it in the scheduling data 134-1. On receiving the first scheduling request and the second scheduling request, the scheduling module 128-1 initially determines whether the communication device 102-2 is registered with the eNB 108-1 or with any other eNB, such as the eNB 108-2. The eNB 108-1 may subsequently grant an uplink channel to the communication devices 102-1 and 102-2. An uplink channel, as will be understood, is the channel used by a communication device to transmit data over a communication network.

On receiving the grant, the transmission modules 144 of the communication devices 102-1 and 102-2 send device parameters and uplink parameters, respectively to the eNB 108-1 either directly or through their respective eNB 108 as the case may be. The device parameters may be defined as parameters, such as buffer status report (BSR) and power head room report (PHR) describing features or operational statistics of the communication devices 102. The BSR, in one example, indicates amount of data, i.e., the size of data packets that the communication device 102 needs to transmit over the D2D communication link 106. The PHR, for example, indicates total power available with the communication device 102 for the transmission of the data over the D2D communication link 106.

The uplink parameter may include, for example, SRSR, i.e., quality of uplink channels measured, based on the SRSP, by the communication device 102 intending to receive the D2D communication. For example, for setup of the D2D communication link 106-1 from the communication device 102-1 to the communication device 102-2, the uplink parameters of communication device 102-1 will be measured and reported by the communication device 102-2. In one implementation, the device parameters are measured and transmitted by the communication device 102-1, while the uplink parameters are transmitted by the communication device 102-2. For instance, from amongst the uplink channels on which transmission quality of the communication device 102-1 is high, the communication device 102-2 may indicate the uplink channels preferred by the communication device 102-2. In one implementation, the communication device 102-2 may simply indicate its transmission quality for all the uplink channels used by the communication device 102-1.

Further, the device parameters and the uplink parameters corresponding to the communication devices 102-1 and 102-2, respectively are received by the transceiver module 126 and stored in the scheduling data 134 and analyzed by the scheduling module 128. In one implementation, the scheduling module 128 may analyze the device parameters and the uplink parameters to determine transmission format of the D2D communication link 106 for the D2D communication. In one implementation, the transmission format may include a physical resource block, modulation and coding format, and power level. The physical resource block may be defined as logical channels for transmission that may be allocated to the communication device 102-1 for the D2D communication. The modulation and coding format may be defined as modulation and techniques, such as Quadrature Phase Shift Keying (QPSK), 64 Quadrature Amplitude Modulation (QAM), and 16 QAM that may be used for coding and modulating data packets to be transferred by the UE1. The power level may be defined as the power at which the UE1 needs to transmit the data packets. For example, based on the SRSR the eNB 108 may determine the uplink channels suitable to both the communication devices 102-1 and 102-2 for the D2D communication. Further, the eNB 108 may analyze the PHR and the BSR to determine whether, based on the distance between communication device 102-1 and communication device 102-2, the communication device 102-1 has enough power to transmit the data to the communication device 102-2 over the D2D communication link 106. The eNB 108 may thus analyze the device parameters and the uplink parameters to determine the transmission format of the D2D communication links.

Further, the eNB 108 may be configured to compare the spectral and power efficiency between data transmission between the communication device 102-1 and 102-2 over the network routed communication links 104 and the D2D communication links 106. For the purpose, the eNB 108 initially determines data transfer rate of the data packets over each of the D2D communication link 106 and the network routed communication link 104 based on the reported device parameters, uplink parameters, and uplink measurements of the eNB 108. In one implementation, the uplink measurements may be defined as SRSR of the communication device 102-1 measured by the eNB 108-1. Based on the comparison, the communication link providing maximum efficiency may be allocated by the eNB 108 to the communication device 102-1 and 102-2. Comparing the data rates over both the communication links 104 and 106 helps in optimizing the D2D communication as the D2D communication links 106 are allocated only when the communication over the D2D communication links 106 is more efficient than over the network routed communication links 104. Further, the eNB 108 may also determine current state of traffic and network resource utilization in both the communication links 104 and 106 to determine if allocating either of the communication links 104 and 106 may lead to congestion in the allocated communication link 104 and 106.

In case communication over the D2D communication link 106 is estimated to be optimum, the control module 132 may transmit an uplink transmit grant and an uplink listen grant, collectively referred to as scheduling grant signals, to the communication devices 102-1 and 102-2, respectively, indicating the transmission format and time of transmission on the D2D communication link 106. In one implementation, the scheduling grant signals may be understood as the signals carrying information related to transmission format and schedule, i.e., time slots allocated for the D2D communication between the communication devices 102-1 and 102-2. Further, analysis data, such as the data rates and the transmission format may be saved in the control data 136.

The scheduling grant signals are subsequently received by the receiver modules 146 of the communication devices 102. In one implementation, each of the receiver modules 146 includes a downlink receiver module 154 and an uplink receiver module 156 for receiving data over a downlink channel and the uplink channel, respectively. For example, the receiver module 146-1 includes a downlink receiver module 154-1 and an uplink receiver module 156-1.

In one implementation, the downlink receiver module 154 of the communication devices 102-1 and 102-2 receives the scheduling grant signals from the eNB 108. Based on the scheduling grant signal, the communication device 102-1 establishes the D2D communication link 106-1 with the communication device 102-2 and initiates data transfer over the D2D communication link 106-1. For instance, the transmission module 144-1 may transmit the data packets to the communication device 102-2 using the uplink channel over the D2D communication link 106-1. In one implementation, the transmission module 144-1 may access the transmission data 150-1 to obtain the data packets for transmission. In one implementation, the uplink receiver module 156 of the communication device 102 is configured to receive the data packets transmitted by the transmission module 144-1 over the D2D communication link 106-1. The communication device 102-2 in turn transmits an acknowledgment signal indicating the success or failure in receipt of the data packet transmitted by the transmission module 144-1. In one implementation, the acknowledgment signal may be either a positive response (ACK) or a negative response (NACK) indicating failure or error in the reception. The ACK, for instance, may indicate a successful reception of the data packets. While the NACK, for example, may indicate an unsuccessful reception, i.e., failure in reception of the data packets. In one implementation, the NACK signal may indicate a type of error that may have resulted in failure of the transmission. In one embodiment, the acknowledgment signal may be received by the communication device 102-1 and the eNB 108. In one embodiment, the communication device 102-2 may transmit two acknowledgment signals simultaneously, with one signal being received by the eNB 108-1 and the other signal be received by the communication device 102-1, simultaneously. In another embodiment, the communication device 102-2 may transmit a single acknowledgment signal having enough power to be received by the eNB 108-1 and the communication device 102-1 simultaneously.

On receiving the acknowledgement signal the communication device 102-1 may determine whether the signal has been successfully received or not. In case of unsuccessful reception, the communication device 102-1 may increase the power used for transmission and send the data packets using the increased power over the D2D communication link 106-1. Further, in case of successful reception, the communication device 102-1 may decrease the power used for transmission and send subsequent data packets using decreased power over the D2D communication link 106-1 to reduce interference to other users in the system. The communication device 102-1 may, otherwise, continue the transmission of the data packets at increased power levels until either a maximum transmission power limit is reached or the acknowledgment signal is received by the uplink receiver module 156-1 from the communication device 102-2.

On receiving the acknowledgement signal the eNB 108 may determine whether the signal has been successfully received or not. In case of unsuccessful reception, the eNB 108 may then allow continued allocation of the D2D communication link 106 for retransmission of the data packets. The continued application allocation of the D2D communication link 106 may be allowed as a condition where the D2D communication link 106 allocated to the communication devices 102-1 and 102-2 remain allocated until a positive acknowledgment indicating successful reception of data is received by the eNB 108-1. In another embodiment, the eNB 108 may also determine whether the communication link should be switched from the D2D communication link 106 to the network routed communication link 104 based on the device parameters and the uplink parameters. For instance, the eNB 108 may determine whether or not it is optimal to transmit the data at the increased power. In case the eNB 108 determines that D2D communication at the increased power is non-optimum, the eNB 108 may switch to the network routed communication link 104.

Further, in case of successful reception, the eNB 108 may allocate the transmission format for D2D communication between other communication devices 102 or for data transfer from the communication device 102-2 to the communication device 102-1. In one implementation, the acknowledgment signal is received by the control module 130 of the eNB 108.

The eNB 108 may thus schedule and control the D2D communication between the communication device 102-1 and 102-2. Further, on successful transmission of the data packets, the eNB 108 may estimate the resources used and time required by the communication devices 102-1 and 102-2 for the D2D communication. Based on the determination, the scheduling module 128 may ascertain billing details that may be used for charging the communication devices 102-1 and 102-2 for utilizing the D2D communication links 106. For instance, the scheduling module 128 may update details of the utilized resources in a billing register (not shown in the figure) which may be utilized by a billing module (not shown in the figure) of the communication network environment 100 to enable the network operator charge the users of the communication devices 102-1 and 102-2 according to tariff rates agreed to by the users and the network operator. In one implementation, the billing module may be installed in the MME 109. In another implementation, the billing module may be installed in the PDN gateway. The eNB 108 may thus be configured to facilitate the network operators in monitoring the D2D communications for charging the users utilizing the D2D communication service of the network.

Further, although, the present subject matter has been described for a two party communication, it will be understood that the systems and methods for scheduling and controlling D2D communication can also be implemented for a multi-party communication, albeit with few modification/alterations. In one embodiment, the eNB 108 may be configured to allow the communication device 102-1 to transmit data to a group, i.e., two or more communication devices 102 over the D2D communication links 106. For instance, the communication device 102-1 may desire to transmit data packets to more than one communication device 102. The communication device 102-1 may thus request the eNB 108-1 for establishing D2D communication links 106 with all the communication devices 102 present in its vicinity.

Further, in case more than one communication devices 102 transmit a scheduling request asking permission for group communication request to the eNB 108, the control module 130 may initially determine the communication devices 102 to whom the permission for group communication may be allowed. In one implementation, the control module 130 may make the determination based on priority rules, such as importance level of the group message indicated by the communication devices 102, the order or timing of receiving the group communication request. For instance, on receiving a verification from the eNB 108 for establishing a D2D communication link, if the communication device 102-1 sends the scheduling request asking permission for group communication request before the communication devices 102-3 and 102-4, the control module 130 may determine the communication device 102-1 as a first communication device, i.e., the communication device allowed to transmit the data packets, while the communication devices 102-3 and 102-4 shall be ascertained as the second communication devices, i.e., the devices that may receive the data packets from the communication device 102-1. determining a least strong communication device, from amongst the at least one second communication device, based at least on sounding reference signal report of each of the at least one second communication device, wherein the sounding reference signal report of each the at least one second communication device include measurement of sounding reference signal of the first communication device.

The control module 130 may subsequently multicast the uplink listen grant for all the communication devices 102 that may be interested in communicating with the communication device 102-1. Further, the eNB 108-1 may analyze the SRSR and the PHR for each of the communication devices 102 to determine weak D2D communication links 106 that may be deactivated and switched to the network routed communication link 104. The SRSR of each the at least one second communication device, as will be understood, include measurement of SRS of the first communication device. Additionally, in such a case all the communication devices 102 communicating with the communication device 102-1 may be understood as the second communication device, i.e., the communication device 102-2. In one embodiment, the eNB 108-1 may determine from among the second communication devices, a least strong D2D communication device, i.e., the communication device having a least strong communication link with the first communication device based on the SRSR and the PHR. Based on the determination, the eNB 108-1 may define the transmission format of the D2D communication links, tailored for the least strong D2D communication device, such that the data packets from the communication device 102-1 are received by all the second communication devices, including the least strong communication device.

Further, in one embodiment, an acknowledgement transmission feature, i.e., ability of transmitting the acknowledgement signals may be suspended in a multi-party communication mode of D2D communication. This is because in multi-party communication receiving multiple acknowledgment signals from all the second communication devices may lead to congestion of the D2D communication links. The other processes for the multi-party communication may thus operate in the same way as for a one-to-one communication, i.e., the D2D communication between the communication devices 102-1 and 102-2 described above.

Furthermore, in one embodiment, the scheduling module 128 and the control module 132 of all the eNBs may be located at a centralized server facilitating quick transmission of the data between the eNBs.

Although the present subject matter has been described in the context of two communication devices 102 registered with the same eNB 108, it will be understood that the method and systems for scheduling and controlling D2D communication may also be implemented between two communication devices 102 registered with two different eNBs 108, albeit with few alteration and/or modifications. The same will be explained in greater details with reference to the FIG. 2(*b*).

FIGS. 2(*a*) and 2(*b*) illustrate call-flow diagrams indicating procedure for scheduling and controlling D2D communication between communication devices 102, in accordance with an embodiment of the present subject matter. The various arrow indicators used in the call-flow diagram depict the transfer of signal/information between the communication devices 102 and the eNBs 108. In many cases, multiple network entities besides those shown may lie between the entities, including transmitting stations, and switching stations, although those have been omitted for clarity. Similarly, various acknowledgement and confirmation network responses may also be omitted for clarity. Although the description of FIG. 2(*a*) and FIG. 2(*b*) has been made in considerable detail with respect to an LTE network, it will be understood that the D2D communication link may implemented for other networks, having a scheduled uplink, as well.

The call flow diagram 200, as described in the FIG. 2(*a*) has been explained in considerable details with respect to the communication device 102-1 being a transmitting party and the communication device 110-2 being a receiving party with both the transmitting party and the receiving party being registered with the same eNB 108-1 and MME 109. It will be understood that the principles described herein may be extended to various other scenarios as well, for example, where more than one communication devices 102 act as the receiving party.

In one implementation, the process of establishing a D2D communication link is initiated with the communication device 102-1 sending a D2D service request 202 to eNB 108-1 providing the eNB 108-1 with the details of the communication device 102-2. The eNB 108-1 subsequently transmits a D2D allowance request 204 to the MME 109 requesting the MME 109 to verify whether the communication devices 102-1 and 102-2 can be allowed to initiate the D2D communication. The D2D allowance request 204 may include, for example, identifier details, such as phone number, IP address, and email address of the communication devices 102-1 and 102-2. On verifying that the details of communication devices 102-1 and 102-2, the MME 109 may transmit a D2D allowance response 206 to the eNB 108-1 indicating whether the communication devices 102-1 and 102-2 may establish the D2D communication. Further, the D2D allowance response 206 may include location or address of the communication device 102-2 indicating the eNB 108 with which the communication device 102-1 is registered. On receiving a confirmation for the allowance of the D2D communication from the MME 109, the eNB 108-1 may send a D2D service response 208-1 and a D2D service notification 208-2 to the communication device 102-1 and 102-2, indicating the allowance for the D2D communication. In one implementation, the D2D service response 208-1 includes the SRSP of the communication device 102-2, while the D2D service notification 208-2 may include the SRSP of the communication device 102-1.

On receiving the D2D service response 208-1, the communication device 102-1 sends a first scheduling request 210 to the eNB 108-1 requesting scheduling of the D2D communication link 106-1 with the communication device 102-2. In one embodiment, the communication device 102-1 transmits the first scheduling request 210 over a physical uplink control channel (PUCCH). The PUCCH may be understood as the channel used to carry uplink control information from the communication device 102 to the eNB 108-1. In one implementation, first scheduling request 210 may include the request for allocation of the uplink channel for communication with the eNB 108-1 and a D2D indication for the eNB 108-1, indicating the intent of the communication device 102-1 to establish the D2D communication link 106 with the communication device 102-2.

The eNB 108-1 subsequently transmits a first uplink grant 212 to the communication device 102-1 indicating the uplink channel that may be used by the communication device 102-1 for transmitting the device parameters. In one embodiment, the eNB 108-1 transmits the first uplink grant 212 over a physical downlink control channel (PDCCH). The communication device 102-1 subsequently transmits the device parameters 214. In one implementation, the device parameters 214 are transmitted over a Physical Uplink Shared Channel (PUSCH). The device parameters 214 may include, for instance the PHR and BSR of the communication device 102-1.

Further, the communication device 102-2 sends a second scheduling request 216 to the eNB 108-1 over the PUCCH. In one implementation, second scheduling request 216 may include the request for allocation of the uplink channel for communication with the eNB 108-1 and a D2D indication for the eNB 108-1, indicating the intent of the communication device 102-2 to establish the D2D communication link 106 with the communication device 102-1. In another implementation, the second scheduling request 216 may include only the request for allocation of the uplink channel for communication with the eNB 108-1. Subsequently, the eNB 108-1 may transmit a second uplink grant 218 to the communication device 102-2 indicating the uplink channel that may be used by the communication device 102-2 for transmitting the uplink parameters. In one embodiment, the eNB 108-1 transmits the second uplink grant 218 over the PDCCH. On receiving the second uplink grant 218, the communication device 102-2 subsequently transmits the uplink parameters 220 over the PUSCH. The uplink parameters 220, may include, for instance SRSR of the communication device 102-1.

On receiving the device parameters 214 and the uplink parameters 220, the scheduling module 128-1 may determine the transmission format of the D2D communication link between the communication devices 102-1 and 102-2. The control module 130-1 subsequently transmits the scheduling grant signal to the communication devices 102-1 and 102-2. In one implementation, the control module 130-1 transmits an uplink listen grant 222 and an uplink transmit grant 224 to the communication device 102-2 and the communication device 102-1, respectively. The uplink transmit grant 224, as will be understood, includes data related to the transmission format of the D2D communication link 106-1 allocated to the communication device 102-1 for the D2D communication. While, the uplink listen grant 222 may include same details as transmitted in the uplink transmit grant 224 in order to enable the communication device 102-2 to receive the data packets transmitted by the communication device 102-1. Further, the control module 130-1 transmits the uplink transmit grant 224 and the uplink listen grant 222 over the PDCCH.

On receiving the uplink transmit grant 224, the communication device 102-1 initiates scheduled data transmission 226 with the communication device 102-2 for transmitting the data packets. In one implementation, the transmission module 144-1 transmits the scheduled data transmission 226 over the PUSCH. The scheduled data transmission 226 is subsequently received by the uplink receiver module 156 of the communication device 102-2. Further, the transmission module 144 of the communication device 102-2 is configured to transmit acknowledgement signals 228-1 and 228-2 to the communication device 102-1 and the eNB 108-1, respectively. In one implementation, the acknowledgement signals 228-1 and 228-2 are transmitted over the PUCCH and with a power level sufficient for reception at both the communication device 102-1 and the eNB 108-1. As previously described, the acknowledgement signals 228-1 and 228-2 indicate success or failure in reception of the data packets by the communication device 102-2.

The call flow diagram 230, as described in the FIG. 2(b) has been explained in considerable details with respect to the communication device 102-1 being a transmitting party registered with eNB 108-1 and the communication 102-2 being a receiving party registered with a different eNB, i.e., the eNB 108-2. It will be understood that the principles described herein may be extended to various other scenarios as well, for example, where more than one communication devices 102 act as the receiving party. Further, for the sake of brevity, and not as a limitation, signals already explained in description of FIG. 2(a) are not explained in the description of FIG. 2(b) and should be understood to work in the same way as in the FIG. 2(a).

In one implementation, the process of establishing a D2D communication link is initiated with the communication device 102-1 sending the D2D service request 202 to the eNB 108-1. The eNB 108-1 subsequently transmits the D2D allowance request 204 to the MME 109 requesting the MME 109 to verify whether the communication devices 102-1 and 102-2 can be allowed to initiate the D2D communication. On verifying that the details of communication devices 102-1 and 102-2, the MME 109 may transmit the D2D allowance response 206 to the eNB 108-1 and a D2D allowance signal 232 to the eNB 108-2 indicating whether the communication devices 102-1 and 102-2 may establish the D2D communication. Further, the eNB 108-1 sends a D2D link info request 234 to the eNB 108-2, requesting the eNB 108-2 to obtain uplink information, such as the SRSP of the communication device 102-2. In one implementation, the eNB 108-1 may also send the SRSP of the communication device 102-1 to eNB 108-2 for being conveyed to the communication device 102-2. Further, the eNB 108-2 may send the SRSP of the communication device 102-2 to the eNB 108-1 over the D2D link info request 234. In one implementation, the eNB 108-1 and the eNB 108-2 may communicate over a backhaul link (X2).

On receiving a confirmation for the allowance, the eNB 108-1 transmits the D2D service response 208-1 to the communication device 102-1 indicating the allowance for the D2D communication and SRSP of the communication device 102-2. In one implementation, the SRSP of the communication device 102-2 is received by the eNB 108-1 from the eNB 108-2. Further, the eNB 108-2 transmits the D2D service notification 208-2 to the communication device 102-2 indicating the allowance for the D2D communication and SRSP of the communication device 102-1. In one implementation, the SRSP of the communication device 102-1 is received by the eNB 108-2 from the eNB 108-1.

On receiving the D2D service response 208-1, the communication device 102-1 sends the first scheduling request 210 to the eNB 108-1. In one implementation, the first scheduling request 210 may include the request for allocation of the uplink channel for communication with the eNB 108-1 and the D2D indication for the eNB 108-1. The eNB 108-1 subsequently transmits the first uplink grant 212 to the communication device 102-1 indicating the uplink channel that may be used by the communication device 102-1 for transmitting the device parameters. The communication device 102-1 subsequently transmits the device parameters 214 to the eNB 108-1, Similarly, the communication device 102-2 sends the second scheduling request 216 to the eNB 108-2 over the PUCCH. In one implementation, the second scheduling request 216 may include the request for allocation of the uplink channel for communication with the eNB 108-2 and the D2D indication for the eNB 108-2. In another implementation, the second scheduling request 216 may include only the request for allocation of the uplink channel for communication with the eNB 108-2. Subsequently, the eNB 108-2 may transmit the second uplink grant 218 to the communication device 102-2 indicating the uplink channel that may be used by the communication device 102-2. In one embodiment, the eNB 108-2 transmits the second uplink grant 218 over the PDCCH. On receiving the second uplink grant 218, the communication device 102-2 subsequently transmits the uplink parameters 220 to the eNB 108-2 over the PUSCH. Further, the eNB 108-2 transmits an uplink parameter signal 236 to the eNB 108-1 over X2, providing the eNB 108-1 the uplink parameters 220 provided by the communication device 102-2.

The control module 130-1 subsequently transmits an eNB listen grant 238 to the eNB 108-2 indicating the transmission format of the D2D communication link 106-1 to be established for the D2D communication. In one implementation, the eNB listen grant 238 may be transmitted by the eNB 108-1 using the backhaul link X2. Further, the eNB 108-1 and the eNB 108-2 transmit the uplink transmit grant 224 and the uplink listen grant 222 to the communication device 102-1 and the communication device 102-2, respectively.

Further, the communication device 102-1, on receiving the uplink transmit grant 224, initiates the scheduled data transmission 226 with the communication device 102-2 for transmitting the data packets. Further, the transmission module 144 of the communication device 102-2 is configured to transmit acknowledgement signals 228-1 and 228-3 to the communication device 102-1 and the eNB 108-2, respectively. In one implementation, the acknowledgement signals 228-1 and 228-3 are transmitted over the PDCCH. Further, on receiving the acknowledgement signal 228-3, the eNB 108-2 transmits an eNB acknowledgement signal 240 to the eNB 108-1 over the X2. As previously described, the acknowledgement signals 228-1, 228-2, and 228-3, collectively referred to as the acknowledgments signals 228, indicate success or failure in reception of the data packets by the communication device 102-2. Further the eNB acknowledgment signal 240 includes data of acknowledgment signals transmitted by the communication device 102-2 to the communication device 102-1 and the different eNB 108-2 and is indicative of success or failure in reception of data packets transmitted by the communication device 102-2 over the D2D communication link 106.

The call flow diagram 230, as described in the FIG. 2(b) has been explained in considerable details with respect to the communication device 102-1 being a transmitting party registered with eNB 108-1 and the communication 102-2 being a receiving party registered with a different eNB, i.e., the eNB 108-2. The concepts explained in relation thereto, may be extended to other scenarios, such as the communication device 102-2 being a transmitting party and the communication 102-1 being a receiving party wherein the communication devices 102 may be registered with same or different eNB 108.

FIG. 3 illustrates method 300 for scheduling and controlling D2D communication in a communication network, according to an embodiment of the present subject matter. The order in which the method is described is not intended to be construed as a limitation, and any number of the described method blocks can be combined in any order to implement the method 300 or any alternative methods. Additionally, individual blocks may be deleted from the methods without departing from the spirit and scope of the subject matter described herein. Furthermore, the methods can be implemented in any suitable hardware, software, firmware, or combination thereof.

The method(s) may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

A person skilled in the art will readily recognize that steps of the methods can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media. The embodiments are also intended to cover both communication network and communication devices configured to perform said steps of the exemplary methods.

At block 302, a D2D service request transmitted by a first communication device is received to request permission for allowing D2D communication with a second communication device. For example, the eNB 108-1 may receive the D2D service request from the communication device 102-1 for allowing the D2D communication with the communication device 102-2.

At block 304, a D2D service request and a D2D service notification is transmitted to the first communication device and the second communication device. For example, the eNB 108-1 may send the D2D service response 208-1 and the D2D service notification 208-2 to the communication device 102-1 and 102-2, indicating the allowance for the D2D communication. In one implementation, the D2D service response 208-1 includes the SRSP of the communication device 102-2, while the D2D service notification 208-2 may include the SRSP of the communication device 102-1. In one implementation, the D2D service request and the D2D service notification are sent after receiving a confirmation for the allowance of the D2D communication from the MME 109.

At block, 306 a first scheduling request and a second scheduling request transmitted by the first communication device and the second communication device, respectively are received to initiate establishment of a D2D communication link. For example, the eNB 108-1 may receive the scheduling request from the communication device 102-1 for establishing a D2D communication link with the second communication device 102-2. In one implementation, the scheduling request may be transmitted over a transmission channel, such as a PUCCH.

At block 308, transmission format of the D2D communication link to be allocated for the D2D communication is determined. In one implementation, the transmission format of the D2D communication link is determined by the eNB 108-1 based on device parameters and uplink parameters received from the communication device 102-1 and the communication device 102-2, respectively. In one implementation, the transmission format may include a physical resource block, modulation and coding format, and power level to be used by the communication device 102-1 for the D2D communication with the second communication device 102-2.

At block 310, an uplink transmit grant and an uplink listen grant is transmitted to the first communication device and the second communication device, respectively. The uplink transmit grant and the uplink listen grant include details related to the transmission format of the D2D communication link. Further, in case the second communication device is registered with a different eNB, then the eNB corresponding to the first communication device may transmit the uplink listen grant to the second communication device through the eNB corresponding to the second communication device. For example, the eNB 108-1 may transmit the uplink transmit grant 224 to the communication device 102-1 over the PDCCH and the downlink transmit grant 224 to the second communication device 102-2 either directly over the PDCCH or through the eNB 108-2. Further, in case of multi-party communication, the eNB 108-1 may multicast the uplink listen grant over the communication network for all the communication devices 102 that may be interested in communicating with the communication device 102-1. In such a case all the communication devices 102 communicating with the first communication device, i.e., the communication device 102-1 may be understood as the second communication device, i.e., the communication device 102-2.

Based on the uplink transmit grant, the first communication device may establish the D2D communication link, such as the D2D communication link 106 with the second communication device 102-2 for transmitting bearer signals having data packets.

At block 312, an acknowledgment signal is received from the second communication device, in case of a two party communication. The acknowledgment signal indicates, for example, success or failure in reception of the data packets transmitted over the D2D communication link. For example, the communication device 102-1 may transmit the acknowledgment signal 228 to the eNB 108-1 and the first communication device 102-1. Further, in case the communication device 102-2 is registered with the eNB 108-2 the communication device 102-2 may transmit the acknowledgment signal 228 to the eNB 108-2 instead of eNB 108-1. The eNB 108-1 may subsequently transmit the acknowledgment signal 228 to the eNB 108-1.

At block 314, based at least on the acknowledgment signal and the device parameters it is determined whether to allow a continued allocation of the D2D communication link for retransmission of the data packets. For example, on receiving a negative acknowledgment, the eNB may determine that the second communication device has failed to receive the data packets transmitted by the first communication device and let the D2D communication link to remain allocated for retransmission of the data packets between the first communication device and the second communication device.

Although embodiments for methods and systems for scheduling and controlling D2D communication in a communication network have been described in a language specific to structural features and/or methods, it is to be understood that the invention is not necessarily limited to the specific features or methods described. Rather, the specific features and methods are disclosed as exemplary embodiments for scheduling and controlling the D2D communication.

We claim:

1. A method for scheduling and controlling device-to-device (D2D) communication, the method comprising:
   receiving device parameters and uplink parameters from a first communication device and at least one second communication device, respectively;
   determining, based on the device parameters and the uplink parameters, transmission format of a D2D communication link to be established between the first communication device and the at least one second communication device, wherein the D2D communication link allows D2D communication between the first communication device and the at least one second communication device; and
   transmitting an uplink transmit grant and an uplink listen grant to the first communication device and the at least one second communication device, respectively, based on the determination, wherein the uplink transmit grant and the uplink listen grant indicate at least the transmission format and time of transmission on the D2D communication link allocated to the first communication device and the at least one second communication device.

2. The method as claimed in claim 1, wherein the determining further comprises:
   ascertaining whether the D2D communication link be established between the first communication device and the at least one second communication device for transmission of data packets from the first communication device to the at least one second communication device, based at least on the device parameters and the uplink parameters;
   computing at least one of data rate for transmission and cost of transmission of data packets over the D2D communication link and a network routed communication link based at least on the device parameters, the uplink parameters, and uplink measurements of signals transmitted by the first communication device and the at least one second communication device; and
   identifying one of the D2D communication link and the network routed communication link to be allocated to the first communication device and the at least one second communication device for transmission of the data packets based on the computing.

3. The method as claimed in claim 1, wherein the method further comprises:

provide sounding reference signal parameters of the first communication device to the least one second communication device;

providing sounding reference signal parameters of the at least one second communication device to the first communication device; and receiving sounding reference signal report of the first communication device from the at least one second communication device, wherein the sounding reference signal report is determined based on the sounding reference signal parameters of the first communication device.

4. The method as claimed in claim 1, wherein the transmitting further comprises transmitting the uplink listen grant to one or more enhanced node Bs (eNBs) with which the at least one second communication device are registered, for transmitting the uplink listen grant to the at least one second communication device upon ascertaining that the one or more eNBs are different from an eNB with which the first communication device is registered.

5. The method as claimed in claim 4, wherein the method further comprises:

receiving, for a two party communication, an eNB acknowledgement signal from at least one of the one or more eNBs, the eNB acknowledgement signal being indicative of one of success and failure in reception of data packets transmitted by the first communication device over the D2D communication link, wherein the eNB acknowledgement signal includes data of acknowledgment signals transmitted by the at least one second communication device to the first communication device and the one or more eNBs; and allowing continued allocation of the D2D communication link for retransmission of the data packets, upon receiving a negative acknowledgement, wherein the negative acknowledgement is indicative of failure in reception of data packets by the at least one second communication device.

6. The method as claimed in claim 1, wherein the method further comprises:

receiving, for a two party communication, an acknowledgement signal from the at least one second communication device, the acknowledgement signal being indicative of one of success and failure in reception of data packets transmitted by the first communication device over the D2D communication link, wherein the acknowledgement signal includes same data as received by the first communication device from the at least one second communication device; and allowing continued allocation of the D2D communication link for retransmission of the data packets, upon receiving a negative acknowledgement from the at least one of the one or more eNBs, wherein the negative acknowledgement is indicative of failure in reception of data packets by the at least one second communication device.

7. The method as claimed in claim 1, wherein the method further comprises:

selecting, based at least on one or more priority rules, the first communication device and the at least one second communication device;

determining a least strong communication device, from amongst the at least one second communication device, based at least on sounding reference signal report of each of the at least one second communication device, wherein the sounding reference signal report of each of the at least one second communication device comprises measurement of sounding reference signal of the first communication device; and defining the transmission format of the D2D communication links to enable transmission of the data packets from the first communication device to each of the at least one second communication device.

8. The method as claimed in claim 7, wherein the method further comprises disabling an acknowledgement transmission feature of the at least one second communication device receiving the uplink listen grant.

9. The method as claimed in claim 1, wherein the method further comprises:

providing a D2D allowance request to a mobility management entity (MME), requesting the MME to verify whether the first communication device and the at least one second communication device can be allowed to initiate the D2D communication, wherein the D2D allowance request includes identifier details of at least one of the first communication device and the at least one second communication device; and receiving a D2D allowance response from the MME, verifying capability of the first communication device and the at least one second communication device for establishing the D2D communication link, wherein the D2D allowance response includes location of the at least one second communication device indicating identity of an eNB with which the at least one second communication device is registered.

10. An enhanced node B comprising:

a node processor and associated node memory;

wherein the node processor is configured to receive device parameters and uplink parameters from a first communication device and at least one second communication device, respectively;

wherein the node processor is configured to determine a transmission format of a D2D communication link between the first communication device and the at least one second communication device based on the device parameters and the uplink parameters, wherein the D2D communication link allows D2D communication between the first communication device and the at least one second communication device;

wherein the node processor is configured to transmit an uplink transmit grant and an uplink listen grant to the first communication device and the at least one second communication device, respectively, based on the determining, wherein the uplink transmit grant and the uplink listen grant indicate the transmission format and time of transmission on the D2D communication link allocated to the first communication device and the at least one second communication device.

11. The enhanced node B as claimed in claim 10, wherein the node processor is configured to ascertain whether the D2D communication link be established between the first communication device and the at least one second communication device for transmission of data packets based from the first communication device to the at least one second communication device, based at least on the device parameters and the uplink parameters;

wherein the node processor is configured to compute at least one of data rate for transmission and cost of transmission of data packets over the D2D communication link and a network routed communication link based at least on the ascertaining, the device parameters, the uplink parameters, and uplink measurements of signals transmitted by the first communication device and the at least one second communication device;

wherein the node processor is configured to identify one of the D2D communication link and the network routed communication link to be allocated to the first communication device and the at least one second communication device for transmission of the data packets based on the computing.

12. The enhanced node B as claimed in claim 10, wherein the node processor is configured to provide sounding reference signal parameters of the first communication device to the least one second communication device and sounding reference signal parameters of the at least one second communication device to the first communication device;

wherein the node processor is configured to receive a sounding reference signal report of the first communication device from the at least one second communication device, wherein the sounding reference signal report is determined by the at least one second communication device based on the sounding reference signal parameters of the first communication device.

13. The enhanced node B as claimed in claim 10, wherein the node processor is configured to ascertain whether the at least one second communication device is registered with the enhanced node B with which the first communication device is registered;

wherein the node processor is configured to determine one or more eNBs with which the at least one second communication device are registered based on the ascertaining;

wherein the node processor is configured to transmit the uplink listen grant to the one or more eNBs with which the at least one second communication device is registered, for transmitting the uplink listen grant to the at least one second communication device based on the identifying.

14. The enhanced node B as claimed in claim 10, wherein the node processor is configured to receive an eNB acknowledgement signal from at least one of the one or more eNBs for a two party communication, the eNB acknowledgement signal being indicative of one of success and failure in reception of data packets transmitted by the first communication device over the D2D communication link, wherein the eNB acknowledgement signal includes data of acknowledgment signals transmitted by the at least one second communication device to the first communication device and the at least one of the one or more eNBs;

wherein the node processor is configured to allow continued allocation of the D2D communication link for retransmission of the data packets, upon receiving a negative acknowledgement from the at least one of the one or more eNBs, wherein the negative acknowledgement is indicative of failure in reception of data packets by the at least one second communication device.

15. The enhanced node B as claimed in claim 10, wherein the node processor is configured to receive an acknowledgement signal from the at least one second communication device for a two party communication, the acknowledgement signal being indicative of one of success and failure in reception of data packets transmitted by the first communication device over the D2D communication link;

wherein the node processor is configured to allow continued allocation of the D2D communication link for retransmission of the data packets, upon receiving a negative acknowledgement, wherein the negative acknowledgement is indicative of failure in reception of data packets by the at least one second communication device.

16. The enhanced node B as claimed in claim 10, wherein the node processor is configured to select the first communication device and the at least one second communication device based at least on one or more priority rules.

17. The enhanced node B as claimed in claim 16, wherein the node processor is configured to determine a least strong communication device from amongst the at least one second communication device based at least on a sounding reference signal report of the at least one second communication device;

wherein the node processor is configured to define the transmission format of the D2D communication links based on the sounding reference signal report of the least strong communication devices.

18. The enhanced node B as claimed in claim 16, wherein the node processor is configured to disable an acknowledgement transmission feature of the at least one second communication device receiving the uplink listen grant.

19. The enhanced node B as claimed in claim 10, wherein the node processor is configured to provide a D2D allowance request to a mobility management entity (MME) requesting the MME to verify whether the first communication device and the second communication device can be allowed to initiate the D2D communication, wherein the D2D allowance request includes identifier details of at least one of the first communication device and the second communication device;

wherein the node processor is configured to receive a D2D allowance response from the MME verifying capability of the first communication device and the second communication device for establishing the D2D communication link, wherein the D2D allowance response includes location of the second communication device indicating identity of an enhanced node B to which the second communication device is registered.

20. The enhanced node B as claimed in claim 10, wherein the node processor is configured to update a billing register for charging he first communication device and the at least one communication devices for utilizing the D2D communication link.

21. A non-transitory computer-readable medium having embodied thereon a computer program for executing a method for scheduling and controlling device-to-device (D2D) communication, the method comprising:

receiving device parameters and uplink parameters from a first communication device and at least one second communication device, respectively;

determining, based on the device parameters and the uplink parameters, transmission format of a D2D communication link between the first communication device and the at least one second communication device, wherein the D2D communication link allows D2D communication between the first communication device and the at least one second communication device; and transmitting an uplink transmit grant and an uplink listen grant to the first communication device and the at least one second communication device, respectively, based on the determination, wherein the uplink transmit grant and the uplink listen grant indicate at least the transmission format and time of transmission on the D2D communication link allocated to the first communication device and the at least one second communication device.

* * * * *